United States Patent
Sisinni et al.

(10) Patent No.: US 9,208,063 B1
(45) Date of Patent: Dec. 8, 2015

(54) METHOD FOR TESTING MOBILE APPLICATION AND ASSOCIATED APPARATUS AND SYSTEM

(71) Applicant: Groupon, Inc., Chicago, IL (US)

(72) Inventors: Fabio Sisinni, Palo Alto, CA (US); Don Chennavasin, Palo Alto, CA (US)

(73) Assignee: Groupon, Inc., Chicago, IL (US)

( * ) Notice: Subject to any disclaimer, the term of this patent is extended or adjusted under 35 U.S.C. 154(b) by 0 days.

(21) Appl. No.: 13/773,184

(22) Filed: Feb. 21, 2013

(51) Int. Cl.
*G06F 9/44* (2006.01)
*G06F 11/36* (2006.01)

(52) U.S. Cl.
CPC .................................. *G06F 11/368* (2013.01)

(58) Field of Classification Search
None
See application file for complete search history.

(56) References Cited

U.S. PATENT DOCUMENTS

| | | | | |
|---|---|---|---|---|
| 8,806,647 B1* | 8/2014 | Daswani | ................ | G06F 3/005 713/161 |
| 2001/0001875 A1* | 5/2001 | Hirsch | .............. | H04M 1/72563 713/1 |
| 2006/0217057 A1* | 9/2006 | Luby | ...................... | G06Q 10/06 455/2.01 |
| 2007/0043863 A1* | 2/2007 | Schlesener | .......... | H04L 12/5692 709/225 |
| 2007/0130156 A1* | 6/2007 | U. Tenhunen | ............ | G06F 8/60 |
| 2010/0161422 A1* | 6/2010 | Zeevi | .................... | G06Q 20/20 705/14.65 |
| 2010/0169174 A1* | 7/2010 | Anderson | .............. | G06Q 10/10 705/14.45 |
| 2011/0145920 A1* | 6/2011 | Mahaffey | .............. | H04W 12/12 726/22 |
| 2013/0198849 A1* | 8/2013 | Aad | ...................... | G06F 21/577 726/26 |
| 2013/0205279 A1* | 8/2013 | Osminer | ............. | G06F 9/44589 717/123 |
| 2013/0318498 A1* | 11/2013 | Mittal | ...................... | G06F 9/44 717/124 |
| 2014/0006155 A1* | 1/2014 | Ramirez | ............ | G06Q 30/0256 705/14.54 |
| 2014/0047417 A1* | 2/2014 | Kaasila | ............... | G06F 11/3664 717/135 |
| 2014/0095933 A1* | 4/2014 | Griesinger | .......... | G06F 11/3688 714/32 |

* cited by examiner

*Primary Examiner* — Don Wong
*Assistant Examiner* — Hossain Morshed
(74) *Attorney, Agent, or Firm* — Alson & Bird LLP

(57) ABSTRACT

The application testing system and method provide an efficient and effective way to test multiple application variants of an application on at least one mobile device. The application testing system may cause a first application variant selection indication to be transmitted to at least one mobile device having the application. The first application variant selection indication may be configured to cause the mobile device to interact with the application according to a first application variant of the plurality of application variants. The application testing system may analyze data corresponding to the usage of the first application variant by the at least one mobile device, and cause a second application variant selection indication to be transmitted to the mobile device, wherein the second application variant selection indication is configured to cause the mobile device to interact with the application according to a second application variant of the plurality of application variants.

36 Claims, 6 Drawing Sheets

METHOD FOR TESTING MOBILE APPLICATION AND ASSOCIATED APPARATUS AND SYSTEM

TECHNICAL FIELD

The present description relates to testing variants of mobile applications. This description more specifically relates to testing variants of mobile applications and modifying the mobile application and testing methods accordingly.

BACKGROUND

Mobile devices may be configured to use applications that may provide various functions to a user. Some applications may be configured to provide a number of promotions and/or marketing services to a user via the mobile device. Another mobile application may be configured to provide a user with the ability to redeem a promotion during a transaction. Applications may have to be updated periodically to provide updated functionality and/or usability. Current methods of testing the functionality and usability of a mobile application are inefficient and laborious, which may potentially make using such a mobile application less enticing.

BRIEF SUMMARY

A method for testing a mobile application comprising a plurality of application variants and an apparatus and system are provided for testing a mobile application comprising a plurality of application variants.

In one example embodiment, a method is provided that includes causing a first application variant selection indication to be transmitted to at least one mobile device of a plurality of mobile devices having the application, wherein the first application variant selection indication is configured to cause the at least one mobile device to interact with the application according to a first application variant of the plurality of application variants. The method may analyze data corresponding to the usage of the first application variant by the at least one mobile device. The method may cause a second application variant selection indication to be transmitted to the at least one mobile device, wherein the second application variant selection indication is configured to cause the at least one mobile device to interact with the application according to a second application variant of the plurality of application variants.

In some embodiments, the method may further include receiving an application launch indication from the at least one mobile device signaling that the application has been launched on the at least one mobile device, and causing at least one of the first variant selection indication or the second variant selection indication to be transmitted to the at least one mobile device based at least in response to receiving the application launching indication. According to some embodiments, the first application variant may be a different application variant when compared to the second application variant. In one example embodiment, the first application variant selection indication may be transmitted to a first mobile device and a second application variant selection indication may be transmitted to a second mobile device.

A method may further comprise removing an application variant from the plurality of application variants based at least on a determination that a variant usage metric has met a predetermined threshold. In some embodiments, the method may include receiving an application launching indication from a third mobile device signaling that the application has been launched, and causing a revised variant selection indication to be transmitted to the third mobile device, wherein the revised variant selection indication may be configured to cause the third mobile device to use a desired application variant. According to some embodiments, an undesired application variant may be one of the first or second application variant and a desired application variant may be the remaining first or second application variant.

According to one example embodiment, the method may include causing an application comprising a plurality of application variants to be provided to a plurality of mobile devices, and receiving data corresponding to the usage of at least the first application variant or the second application variant from the at least one mobile device. In some embodiments, the method may include modifying the application based at least in response to analyzing data corresponding to the usage of the first application variant by the at least one mobile device. According to some embodiments, the method may include causing a modified application comprising a plurality of variants to be transmitted to a plurality of mobile devices, wherein the modified application does not include an undesired application variant previously provided in the application.

In one example embodiment, an apparatus is provided for testing a mobile application, the apparatus comprising at least one processor, and at least one memory including computer program code, the at least one memory and the computer program code configured to, with the at least one processor, cause the apparatus to at least cause a first application variant selection indication to be transmitted to at least one mobile device of a plurality of mobile devices having the application. The at least one memory and the computer program product are further configured to, with the at least one processor, analyze data corresponding to the usage of the first application variant by the at least one mobile device. The at least one memory and the computer program product may be further configured to, with the at least one processor, cause a second application variant selection indication to be transmitted to the at least one mobile device.

In one embodiment, the first application variant selection indication may be configured to cause the at least one mobile device to interact with the application according to a first application variant of the plurality of application variants, and the second application variant selection indication may be configured to cause the at least one mobile device to interact with the application according to a second application variant of the plurality of application variants. According to one embodiment, the at least one memory and the computer program product are further configured to, with the at least one processor, receive an application launch indication from the at least one mobile device signaling that the application has been launched on the at least one mobile device. In some embodiments, the at least one memory and the computer program product are further configured to, with the at least one processor, cause at least one of the first variant selection indication or the second variant selection indication to be transmitted to the at least one mobile device based at least in response to receiving the application launching indication. According to some embodiments, the first application variant may be a different application variant when compared to the second application variant. In one embodiment, the at least one memory and the computer program product are further configured to, with the at least one processor, cause a first application variant selection indication to be transmitted to a first mobile device, and a second application variant selection indication to be transmitted to a second mobile device.

According to some embodiments, the at least one memory and the computer program product are further configured to, with the at least one processor, cause the apparatus to remove an application variant from the plurality of application variants based at least on a determination that usage falls below a certain threshold. In some embodiments, the at least one memory and the computer program product are further configured to, with the at least one processor, cause the apparatus to receive an application launching indication from a third mobile device signaling that the application has been launched. In one embodiment, the at least one memory and the computer program product may be configured to, with the at least one processor, cause the apparatus to cause a revised variant selection indication to be transmitted to a third mobile device, the revised variant selection indication configured to cause the third mobile device to use a desired application variant, wherein an undesired application variant is one of the first or second application variants, and wherein the desired application variant is the remaining first or second application.

According to one embodiment, the at least one memory including computer program code is further configured to, with the at least one processor, cause the apparatus to cause an application comprising a plurality of application variants to be provided to a plurality of mobile devices. In one embodiment, the at least one memory and the computer program product are further configured to, with the at least one processor, cause the apparatus to receive data corresponding to the usage of at least the first application variant or the second application variant from the at least one mobile device.

In some embodiments, the at least one memory including computer program code is further configured to, with the at least one processor, cause the apparatus to modify the application based at least in response to analyzing data corresponding to the usage of the first application variant by the at least one mobile device. According to one embodiment, the at least one memory and the computer program product are further configured to, with the at least one processor, cause the apparatus to cause a modified application comprising a plurality of variants to be transmitted to a plurality of mobile devices, wherein the modified application does not include an undesired application variant previously provided in the application.

In some embodiments, a computer program product is provided, the computer program product comprising at least one computer readable non-transitory memory medium having program code instructions stored thereon, the program code instructions which when executed by an apparatus cause the apparatus at least to cause a first application variant selection indication to be transmitted to at least one mobile device of a plurality of mobile devices having the application, wherein the first application variant selection indication is configured to cause the at least one mobile device to interact with the application according to a first application variant of the plurality of application variants. In some embodiments, a computer program product is provided, the computer program product comprising at least one computer readable non-transitory memory medium having program code instructions stored thereon, the program code instructions which when executed by an apparatus cause the apparatus at least to analyze data corresponding to the usage of the first application variant by the at least one mobile device. According to some embodiments, a computer program product is provided, the computer program product comprising at least one computer readable non-transitory memory medium having program code instructions stored thereon, the program code instructions which when executed by an apparatus cause the apparatus at least to cause a second application variant selection indication to be transmitted to the at least one mobile device, wherein the second application variant selection indication is configured to cause the at least one mobile device to interact with the application according to a second application variant of the plurality of application variants.

In some embodiments, a computer program product is provided, the computer program product comprising at least one computer readable non-transitory memory medium having program code instructions stored thereon, the program code instructions which when executed by an apparatus cause the apparatus at least to receive an application launch indication from the at least one mobile device signaling that the application has been launched on the at least one mobile device. In one embodiment, a computer program product is provided, the computer program product comprising at least one computer readable non-transitory memory medium having program code instructions stored thereon, the program code instructions which when executed by an apparatus cause the apparatus at least to cause at least one of the first variant selection indication or the second variant selection indication to be transmitted to the at least one mobile device based at least in response to receiving the application launching indication. According to some embodiments, the first application variant may be a different application variant when compared to the second application variant. The first application variant selection indication may be transmitted to a first mobile device, and the second application variant selection indication may be transmitted to a second mobile device.

In one embodiment, a computer program product is provided, the computer program product comprising at least one computer readable non-transitory memory medium having program code instructions stored thereon, the program code instructions which when executed by an apparatus cause the apparatus at least to remove an application variant from the plurality of application variants based at least on a determination that usage falls below a certain threshold. In some embodiments, a computer program product is provided, the computer program product comprising at least one computer readable non-transitory memory medium having program code instructions stored thereon, the program code instructions which when executed by an apparatus cause the apparatus at least to receive an application launching indication from a third mobile device signaling that the application has been launched. The computer program product comprising at least one computer readable non-transitory memory medium having program code instructions stored thereon, the program code instructions which when executed by an apparatus may cause the apparatus at least to cause a revised variant selection indication to be transmitted to the third mobile device. The revised variant selection indication may be configured to cause the third mobile device to use a desired application variant, wherein an undesired application variant is one of the first or second application variants, and wherein the desired application variant is the remaining first or second application.

In some embodiments, a computer program product is provided, the computer program product comprising at least one computer readable non-transitory memory medium having program code instructions stored thereon, the program code instructions which when executed by an apparatus cause the apparatus at least to cause an application comprising a plurality of application variants to be provided to a plurality of mobile devices. According to one embodiment, a computer program product is provided, the computer program product comprising at least one computer readable non-transitory memory medium having program code instructions stored thereon, the program code instructions which when executed by an apparatus cause the apparatus at least to receive data corresponding to the usage of at least the first application variant or the second application variant from the at least one mobile device. In one embodiment, a computer program product is provided, the computer program product comprising at least one computer readable non-transitory memory medium having program code instructions stored thereon, the program code instructions which when executed by an apparatus cause the apparatus at least to modify the application based at least in response analyzing data corresponding to the usage of at least one of the variants of the application by the at least one mobile device. In some embodiments, the modified application does not include an undesired variant previously provided in the application.

According to some embodiments, a mobile application testing system is provided, the system comprising a mobile application testing server comprising processing circuitry configured to cause a first application variant selection indication to be transmitted to at least one mobile device of a plurality of mobile devices having the application, wherein the first application variant selection indication is configured to cause the at least one mobile device to interact with the application according to a first application variant of the plurality of application variants. In some embodiments, the system may include processing circuitry configured to analyze data corresponding to the usage of the first application variant by the at least one mobile device. According to one embodiment, the system may include processing circuitry configured to cause a second application variant selection indication to be transmitted to the at least one mobile device, wherein the second application variant selection indication is configured to cause the at least one mobile device to interact with the application according to a second application variant of the plurality of application variants. The system may further comprise communications circuitry configured to facilitate communications with at least one mobile device, and further configured to receive an application launch indication from the at least one mobile device signaling that the application has been launched on the at least one mobile device. In some embodiments, the system may include at least one mobile device comprising a display configured to display a mobile application, communications circuitry configured to facilitate communications with at least one mobile application testing server, and processing circuitry configured to wirelessly receive the plurality of variant selection indications from the mobile application testing server and to send the application launching indication to the mobile application testing server.

According to one embodiment, a method for testing application variants of an application on a mobile device is provided, the method comprising transmitting an application launch indication signaling that the application has been launched on the at least one mobile device. The method may further include receiving a first application variant selection indication, wherein the mobile device includes an application, wherein the first application variant selection indication is configured to cause the at least one mobile device to interact with the application according to a first application variant of the plurality of application variants. In some embodiments, the method may comprise transmitting data corresponding to the usage of at least the first application variant by the mobile device. In one embodiment, the method may include receiving a second application variant selection indication, wherein the second application variant selection indication is configured to cause the at least one mobile device to interact with the application according to a second application variant of the plurality of application variants.

In one embodiment, a method may include receiving a first application variant selection indication, wherein receiving the first application variant selection indication is caused by at least transmitting an application launch indication to a mobile application testing server. In some embodiments, the first application variant may be a different application variant when compared to the second application variant.

According to one embodiment, a method may include receiving a second application variant selection indication, wherein receiving a second application variant selection indication is caused in part by transmitting data corresponding to the usage of the at least first application variant by the mobile device. In one embodiment, the method may further comprise receiving an undesired variant indication configured to cause the at least one mobile device to not interact with the application according to the undesired application variant of the plurality of application variants. The undesired application variant may be one of the first or second application variants. According to some embodiments, a method may include receiving a modified application comprising a plurality of variants, wherein the modified application does not include the undesired application variant previously provided in the application.

Other systems, methods, and features will be, or will become, apparent to one with skill in the art upon examination of the following figures and detailed description. It is intended that all such additional systems, methods, features and be included within this description, be within the scope of the disclosure, and be protected by the following claims.

BRIEF DESCRIPTION OF THE DRAWINGS

Figure 1:
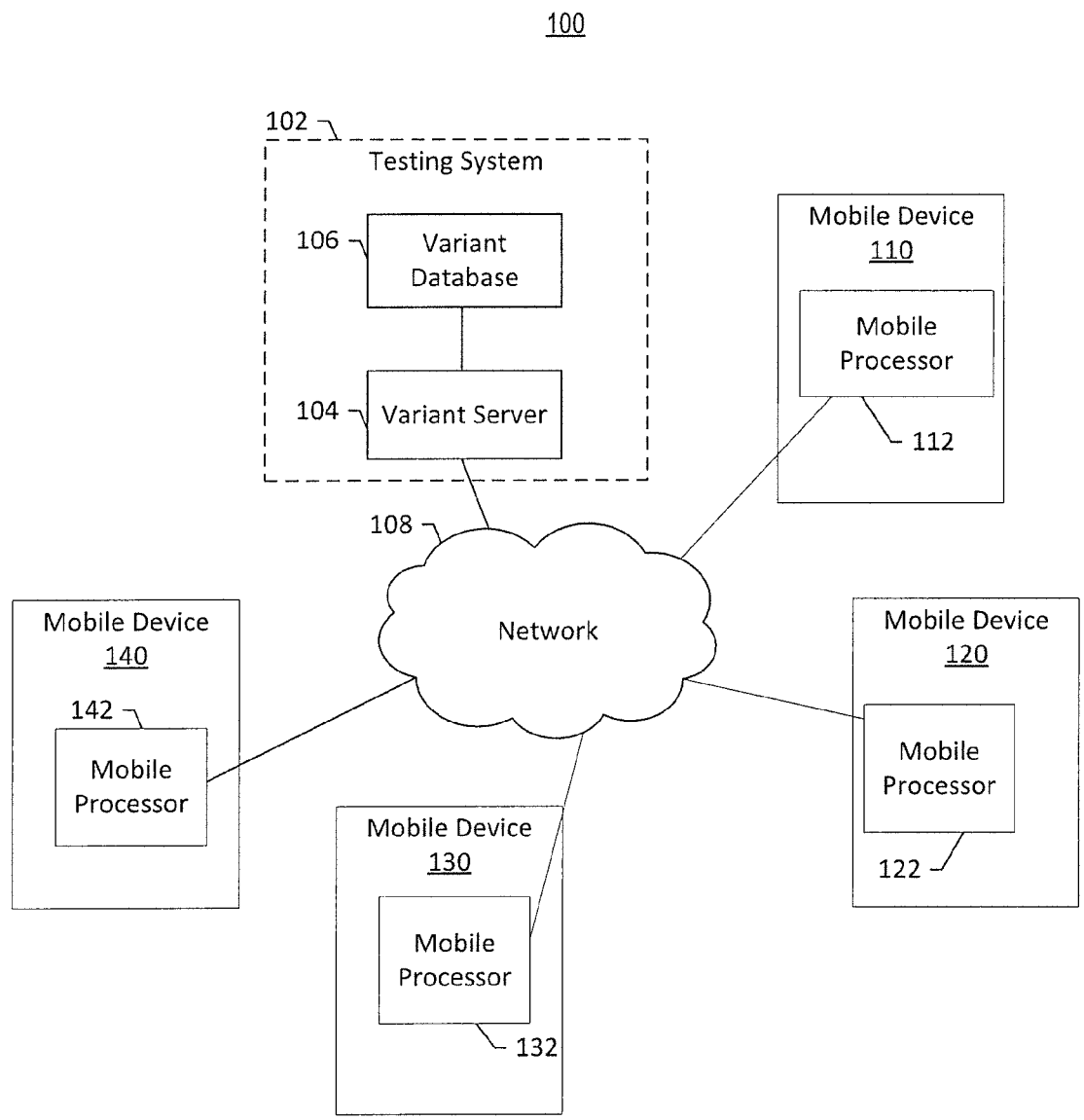
Figure 2:
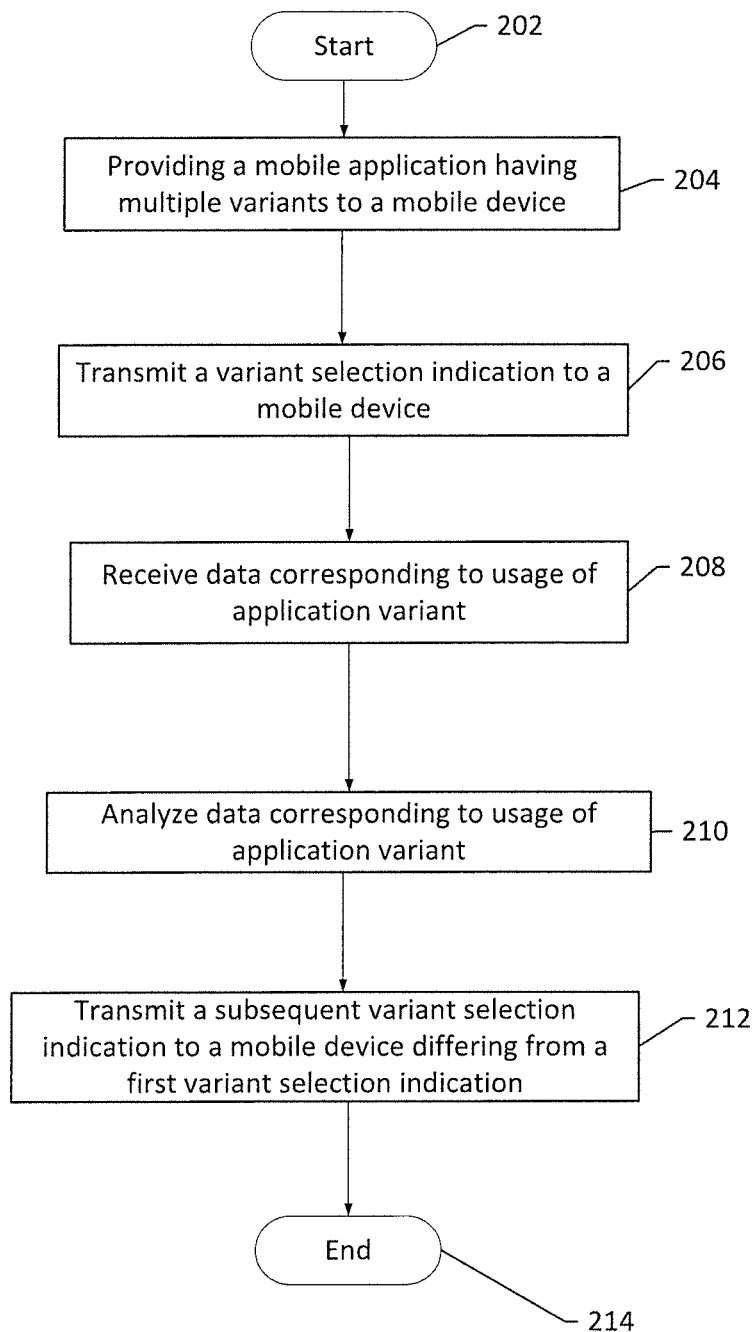
Figure 3:
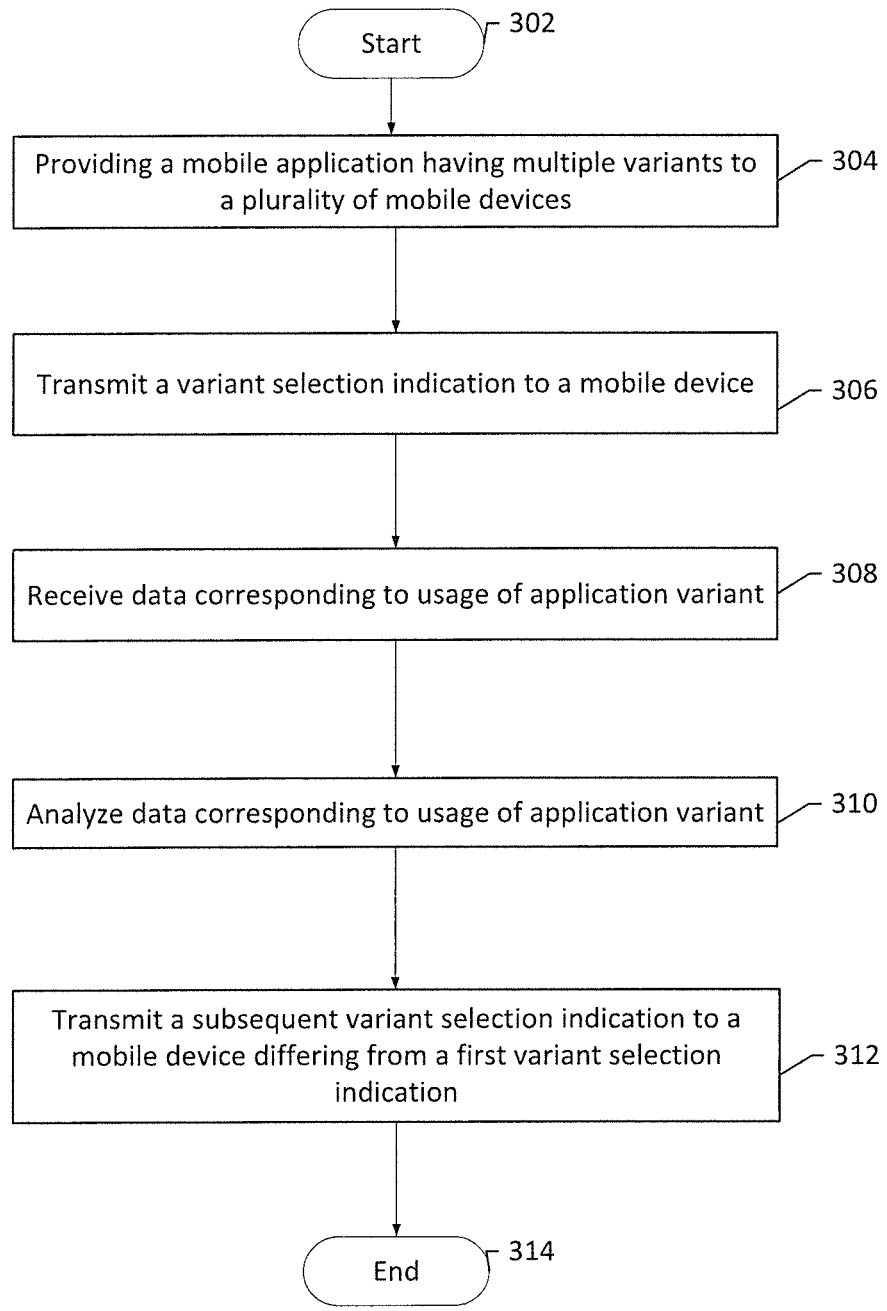
Figure 4:
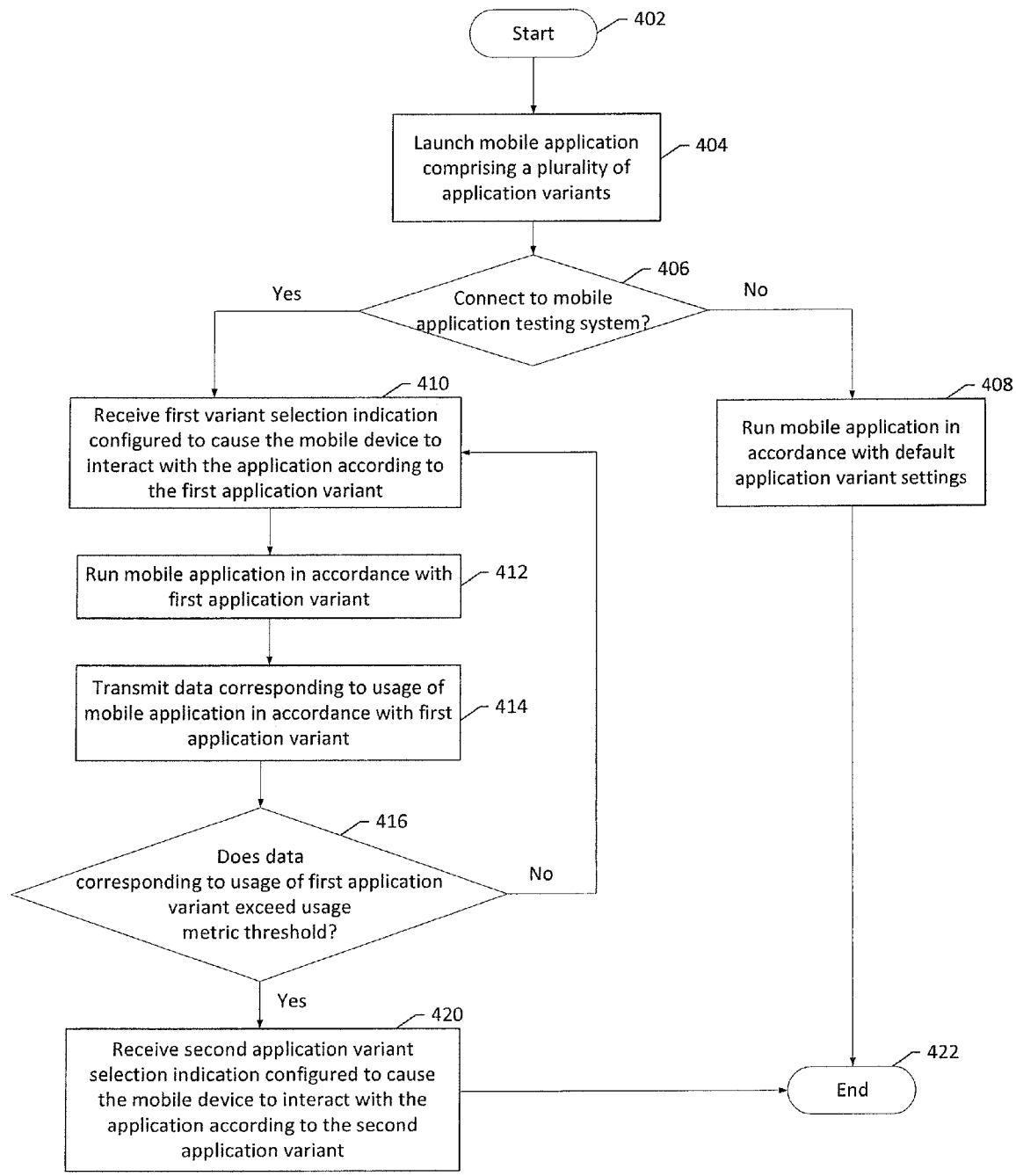
Figure 5:
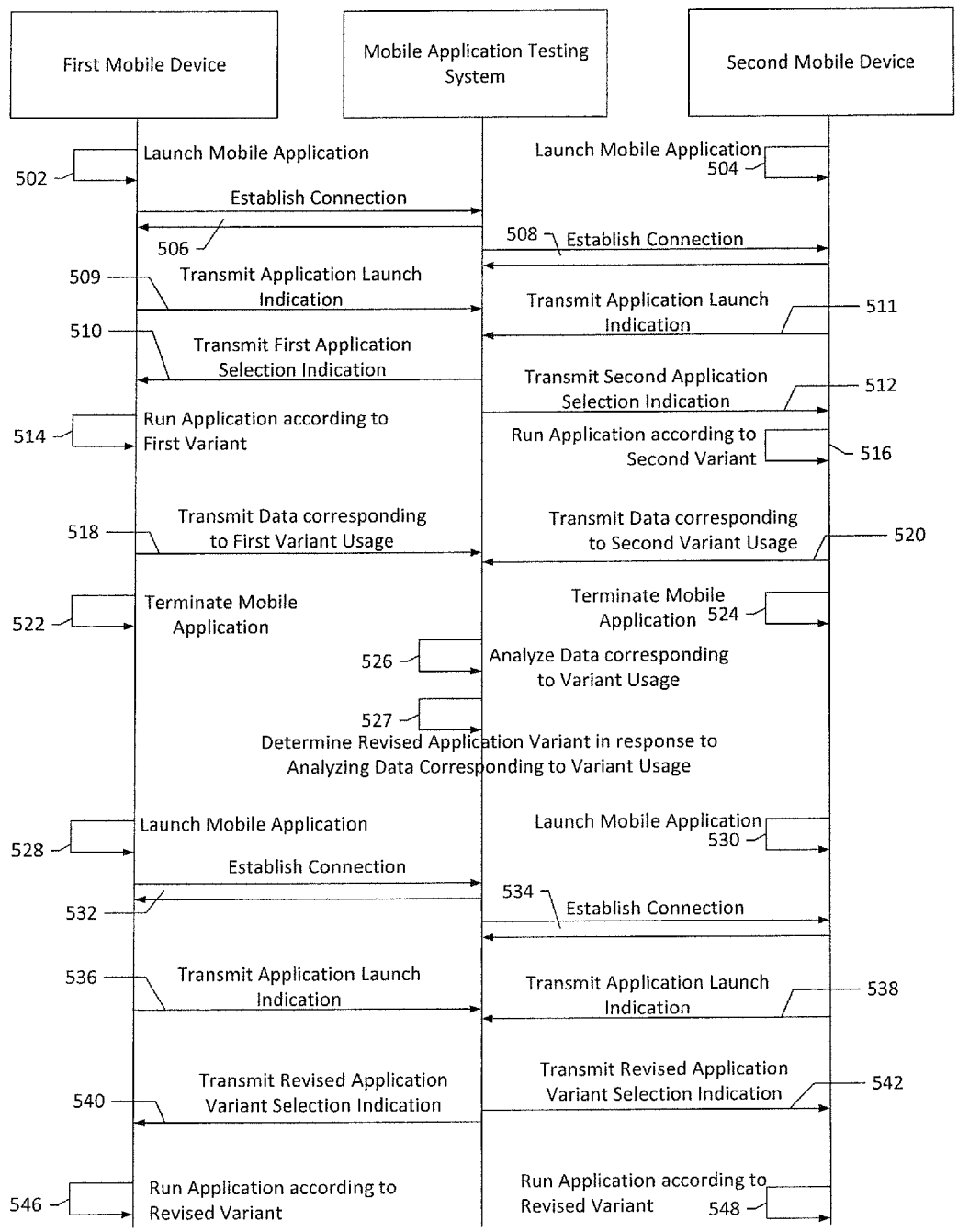
Figure 6:
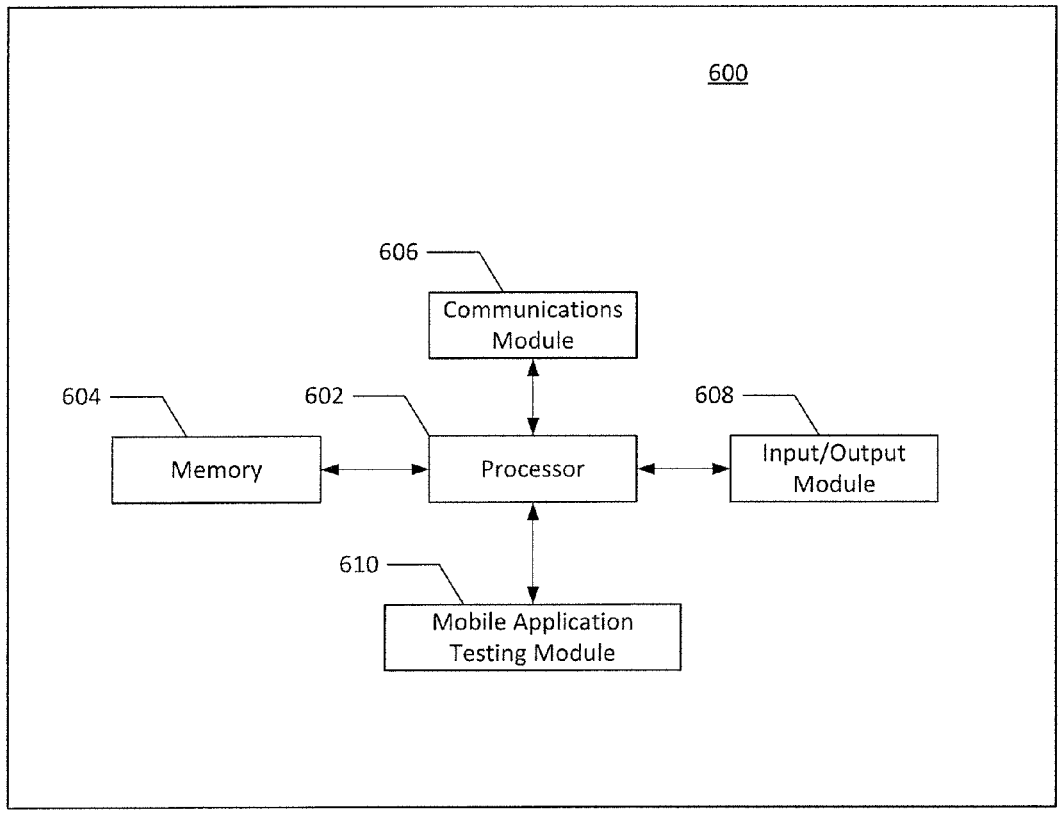

Having thus described embodiments of the invention in general terms, reference will now be made to the accompanying drawings, which are not necessarily drawn to scale, and wherein:

FIG. 1 illustrates an example system in accordance with some embodiments discussed herein;

FIG. 2 illustrates a flow chart detailing a method of testing a plurality of application variants of a mobile application according to an example embodiment;

FIG. 3 illustrates a flow chart detailing a method of testing a plurality of application variants of a mobile application according to an example embodiment;

FIG. 4 illustrates a flow chart detailing a method of testing a plurality of application variants of a mobile application according to an example embodiment;

FIG. 5 illustrates a flow chart detailing a method of testing a plurality of application variants of a mobile application according to an example embodiment; and FIG. 6 illustrates a block diagram of circuitry which may be included in a mobile application testing system and/or a mobile device according to an example embodiment.

DETAILED DESCRIPTION

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like. Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

The principles described herein may be embodied in many different forms. Not all of the depicted components may be required, however, and some implementations may include additional, different, or fewer components. Variations in the arrangement and type of the components may be made without departing from the spirit or scope of the claims as set forth herein. Additional, different, or fewer components may be provided.

Embodiments discussed herein may be configured to provide for testing of multiple variants of a mobile application by a plurality of users via a plurality of mobile devices. In this regard, one advantage that may be realized by some embodiments discussed herein is that testing of multiple variants of a mobile application by a particular mobile device user may be conducted without interrupting the user's usage of and/or experience with the mobile application. For example, a mobile device user may actively use a particular variant of a mobile application on a mobile device, which communicates information corresponding to the usage of the particular variant of the mobile application by the user to a testing server, without interrupting the user's usage of and/or experience with the mobile application.

Another advantage realized by some embodiments discussed herein includes refining a mobile application comprising multiple variants for mobile device users of a particular geographical location. For example, users of one geographical location may use the mobile application in a different manner than users from another geographical location. Accordingly, embodiments of the present invention may provide for modifying the mobile application such that users of a particular geographical location use a variant of the mobile application in a manner suited for that particular geographical location.

FIG. 1 illustrates a system 100 including an example network architecture, which may include one or more devices and sub-systems that are configured to implement some embodiments discussed herein. For example, system 100 may include a mobile application variant testing system 102, which can include, for example, mobile application variant testing server 104 and mobile application variant database 106. Mobile application variant testing server 104 can be any suitable network server and/or other type of processing device. Mobile application variant database 106 can be any suitable network database configured to store mobile application variant usage data and/or analytics data, such as that discussed herein. In this regard, system 102, may include, for example, at least one backend data server, network database, cloud computing device, among other things. As discussed herein, mobile devices 110, 120, 130, 140 can be any suitable mobile device, such as a cellular phone, tablet computer, smartphone, etc., or other type of mobile processing device that may be used for any suitable purpose.

Testing system 102 may be coupled to one or more mobile devices 110, 120, 130, 140 (e.g., consumer device, merchant device, etc.) via network 108. In this regard, network 108 may include any wired or wireless communication network including, for example, a wired or wireless local area network (LAN), personal area network (PAN), metropolitan area network (MAN), wide area network (WAN), mobile broadband network, or the like, as well as any hardware, software and/or firmware required to implement it (such as, e.g., network routers, etc.). For example, network 108 may include a cellular telephone, an 602.11, 602.16, 602.20, and/or WiMax network. Further, the network 108 may include a public network, such as the Internet, a private network, such as an intranet, or combinations thereof, and may utilize a variety of networking protocols now available or later developed including, but not limited to TCP/IP based networking protocols.

FIG. 2 illustrates a flow chart for an example embodiment of a method 200 of testing application variants of an application on a mobile device, such as a mobile device, a smartphone, a laptop, a mobile computing device, a tablet computing device, and/or the like and/or any number of those devices.

Method 200 may begin at 202 and proceed to 204, where a mobile application testing system provides a mobile application comprising a plurality of application variants to a mobile device. For example, a mobile application may be configured to provide a promotion and marketing service to a plurality of consumers via a plurality of mobile devices. According to one embodiment, a mobile application may be configured to provide for the purchasing of a promotion by displaying a number of promotions on the display of a mobile device as a graphical element, such as an icon, that corresponds to the particular promotion. In some embodiments, the mobile application may include a second application variant configured to display the number of promotions on a map displayed by the display of the mobile device. Some embodiments may provide any number of application variants, such as a third application variant, wherein the mobile application may be configured to display the number of promotions on the display of the mobile device in a list format. A promotion and marketing service may be defined as a service that is accessible via one or more computing devices and is operable to provide example promotion and/or marketing services on behalf of one or more providers that are offering one or more instruments that are redeemable for goods, services, experiences and/or the like.

At 206, the testing system may be configured to provide a variant selection indication to a mobile device. The variant selection indication may be configured to cause the mobile device to interact with the mobile application according to a first application variant of the plurality of application variants. For example, the mobile application may include a plurality of application variants, wherein the plurality of application variants may provide for a user to interact with the mobile application in a plurality of ways, each way corresponding to a particular application variant.

In one embodiment, a mobile application configured to provide a promotion and marketing service may be configured to provide a display of a mobile device with a graphical user interface comprising a number of buttons and/or other user selectable elements. As such, one application variant may cause the mobile application to vary the size, shape, color, representation and/or the like of such a button or other user selectable elements. In another embodiment, a mobile application may be configured to display a map on a display of a mobile device indicating locations corresponding to a promotion and/or marketing service. Accordingly, one application variant may cause the mobile application to vary map details, such as zoom level, map colors, map orientation, and/or the like.

In another embodiment, a mobile application may be configured to provide a display of mobile device with a display portion configured to display a plurality of promotions and/or marketing services with a slideshow, carousel, and/or the like of user selectable elements, such as a plurality of icons, wherein each icon corresponds to a particular promotion and/or marketing service. As such, one application variant may be configured to cause the mobile application to display the particular promotions and/or marketing services according to the preferences of the user of the mobile device. Another application variant may be configured to allow a user to select a parameter to refine how user selectable elements, such as the plurality of icons, are displayed on the mobile device. In another embodiment, an application variant may cause an application of a mobile device to cause the display of a mobile device to display a plurality of user selectable elements based at least upon the user's past history of redeeming promotions and/or marketing services.

At 208, a mobile application testing system may be configured to receive data corresponding to the usage of a particular application variant by at least one mobile device from the mobile device. For example, the mobile application may store and/or transmit data corresponding to information regarding which promotions and/or marketing services a user redeems on a mobile device. In some embodiments, a mobile device may be configured to transmit data to a mobile application testing system corresponding to when a user interacts with the mobile application (e.g., a user may interact with the mobile application proximate mid-day to search for promotions and/or marketing services related to lunch). In another embodiment, a mobile application testing system may be configured to receive data corresponding to a user's location at which the user interacts with the mobile application. For example, the user may launch the mobile application at a workplace, home, or other frequented location, such as a favorite shop, restaurant, merchant and/or the like, so as to search for promotions and/or marketing services that are close in proximity to the user at the particular location.

At 210, a mobile application testing system may be configured to analyze data corresponding to the usage of a particular application variant by a user of a mobile device. For example, the mobile application testing system may include a database configured to store data corresponding to a particular user's usage of the mobile application comprising a plurality of application variants and/or the user's usage of redeeming promotions and/or marketing services on one or more other computing devices. Accordingly, the mobile application testing system may be configured to analyze data corresponding to a user's usage of the mobile application compared to the user's usage of a promotion and marketing service provided via other computing devices and/or the like. For example, a user may use a mobile application on a mobile device to redeem promotions related to restaurants, foods, drinks, and/or other eateries on the mobile device more frequently than when using other computing devices. As such, the mobile application testing system may be configured to store data corresponding to such usage and may be further configured to determine such distinctions.

At 212, a mobile application testing system may be configured to provide a subsequent variant selection indication to the mobile device, wherein the subsequent variant selection indication differs from the first variant selection indication. For example, the first variant selection indication may cause a mobile device to interact with the mobile application according to a first application variant, such as a variant of the mobile application configured to cause the mobile device to display a plurality of promotions and/or marketing services on the display that are redeemable at a location within a certain distance from the mobile device.

In one embodiment, the mobile application testing system may be configured to provide a subsequent variant selection indication to the mobile device, wherein the subsequent variant selection indication may cause the mobile device to interact with the mobile application according to an application variant different from the first application variant. For example, the mobile application testing system may be configured to cause the mobile device to display a plurality of promotions and/or markets services on the display of the mobile device that are redeemable at a location that is within a particular distance from a frequented location of the user of the mobile device, such as the user's home, workplace, and/or the like, even when the mobile device is not located at the frequented location. Method 200 may then end at 214.

FIG. 3 illustrates a flow chart for another example embodiment of a method of testing application variants of an application on a mobile device. In some embodiments, the method may be performed by a plurality of mobile devices. As will be apparent to one of ordinary skill in the art in view of this disclosure, although FIG. 1 illustrates a method of testing application variants with four mobile devices, example embodiments may be performed by any number of mobile devices.

Method 300 may begin at 302, and proceed to 304, where a mobile application testing system provides a mobile application having multiple variants to a plurality of mobile devices. For example, a mobile application configured to provide a promotion and marketing service to a plurality of consumers via mobile devices may be provided to the plurality of mobile devices by the mobile application testing system. Further, in some embodiments, the mobile application testing system may comprise a mobile application testing server and a mobile application testing database.

At 306, the testing system may be configured to provide a variant selection indication to a plurality of mobile devices. In some embodiments, the testing system may be configured to provide a first application variant selection indication to a first mobile device and a second application variant selection indication to a second mobile device. In another embodiment, the mobile application testing system may be configured to provide a plurality of application variant selection indications to a plurality of mobile devices, each of the mobile devices receiving an application variant selection indication configured to cause the mobile device to interact with the mobile application in accordance with the application variant.

According to some embodiments, each of the plurality of variants may correspond to a particular test, such as a metric, experiment, and/or the like, of the mobile application. In some embodiments, the test may include at least two variants. As such, a test of the mobile application may be configured to determine, quantify, model, and/or compute various metrics or measurements of a user's interaction with the mobile application. For example, in one embodiment, a test may attempt to quantify the amount of time a mobile application runs on a mobile device when the a first variant of a mobile application is configured to cause a mobile device to display only one promotion versus when a second variant of the mobile application is configured to cause the mobile device to display multiple promotions on a display of the mobile device. As such, each of the mobile devices may be configured to receive an application variant selection indication configured to cause each of the mobile devices to interact with the mobile application in accordance with a particular application variant corresponding to a particular test of the mobile application.

At 308, a mobile application testing system may be configured to receive data corresponding to the usage of the mobile application device in accordance with the plurality of variants. For example, a first mobile device may be configured to transmit data to a mobile application variant testing system corresponding to the percentages of promotions purchased when a first application variant causes the mobile device to interact with the mobile application by displaying a single promotion on the mobile device display. A second mobile device may be configured to transmit data to a mobile application variant testing system corresponding to the percentages of promotions purchased when a second application variant causes the mobile device to interact with the mobile application by displaying a plurality of promotions on the mobile device display. Accordingly, the mobile application testing system may be configured to receive data from a plurality of mobile devices, each of the mobile devices configured to interact with the application according to at least one of the first or second application variant.

At 310, the mobile application testing system may be configured to analyze data corresponding to the usage of the at least first or second application variant. For example, the mobile application testing system may be configured to analyze data corresponding to at least one mobile device interacting with the application in accordance with a first application variant, the first application variant of the mobile application causing the mobile device display a single promotion on the mobile device display, and to analyze data corresponding to at least a second mobile device interacting with the application in accordance with a second application variant, the second application variant of the mobile application causing the mobile device display multiple promotions. As such, data corresponding to the usage of the first and second application variant may illustrate that promotions are purchased at a higher percentage when the first application variant selection indication is transmitted to a mobile device compared to when the second application variant selection indication is transmitted to a mobile device.

As such, at 312, the mobile application testing system may be configured to transmit a modified application variant selection indication. For example, the mobile application testing system may be configured to transmit only the first application variant selection indication after analyzing data corresponding to the usage of the first and second application variant, wherein the first application selection indication caused users interacting with the mobile device to purchase promotions at a greater percentage than the second application selection indication. Method 300 may then end at 314.

FIG. 4 illustrates a flow chart for another example embodiment of a method of testing application variants of an application on a mobile device. In some embodiments, the method may be performed by a mobile device configured to communicate with a mobile application testing system. In some embodiments, the mobile device may be able to communicate with the mobile application testing system such that the mobile device and the system may be configured to transmit and/or receive data, indications, instructions, and the like from one another. According to some embodiments, the mobile device may be configured to run a mobile application comprising a plurality of application variants even though the mobile device is unable to communicate with the mobile application testing system The method 400 may start at 402. At 404, a mobile device may launch a mobile application comprising a plurality of application variants. For example, a mobile device may be configured to receive an input from a user corresponding to an indication to launch the mobile application. In some embodiments, the mobile device may comprise at least a touch display configured to receive an indication of a user input, such as a touch input corresponding to a selection of a graphical element corresponding to the mobile application. In some embodiments, the mobile device may further comprise a communications module configured to communicate with a mobile application testing system, as described in further detail herein.

At 406, the mobile device may connect with the mobile application testing system via a network, as shown in FIG. 1. If the mobile device is unable to connect to the mobile application testing system, then the mobile application may be configured to cause the mobile device to interact with the application according to a default variant. In some embodiments, the default variant may be the last previously used variant of the application. According to some embodiments, the default variant may be a first application variant when the mobile device has not previously launched the application. Accordingly, when the mobile device is unable to connect to the mobile application testing system, the mobile device is unable to provide the mobile application testing system with data corresponding to the usage of the mobile application concurrently with the usage of the mobile application by the mobile device. As such, the method may end at 422. In another embodiment, the mobile device may be configured to store data corresponding to the usage of the mobile device in accordance with the default variant such that upon connecting to the mobile application testing system at a later instance, the mobile device may be configured to transmit the data corresponding to the usage of the application according to the default variant.

If the mobile device is able to connect to the mobile application testing system, the mobile device may be configured to receive a first variant selection indication from the mobile application testing system at 410, the first variant selection indication being configured to cause the mobile device to interact with the mobile application according to the first application variant. For example, the mobile application testing system may be configured to transmit a first variant selection indication to a mobile device, wherein the first variant selection indication is configured to cause the mobile device to interact with the mobile application according to a first application variant of the plurality of application variants. For example, the first variant selection indication may cause the mobile device to display a map, wherein the map displays the location of the mobile device and at least 10 promotions and/or marketing services that are located within 1 mile of the mobile device. A second application variant may cause the mobile device to display a map, wherein the map displays the location of the mobile device and at least 10 promotions and/or marketing services that are located within 5 miles of the mobile device. Accordingly, at 412, the mobile device, having received the first variant selection indication, may run the mobile application in accordance with the first application variant, thereby displaying a map on the mobile device displaying the location of the mobile device and at least 10 promotions and/or marketing services that are located within 1 mile of the mobile device.

At 414, the mobile device may be configured to transmit data corresponding to the usage of the mobile application in accordance with the first application variant. For example, when using the first application variant configured to cause the mobile device to initially display a map displaying the location of the mobile device and at least 10 promotions and/or marketing services that are located within 1 mile of the mobile device, a user may provide an input to the mobile device to cause the map displayed by the mobile device to zoom out to show at least 10 promotions and/or marketing services within 5 miles of the mobile device. In some embodiments, the mobile device may be configured to transmit data corresponding to a user's first input after the map is displayed according to the first application variant (i.e., the map displaying 10 promotions within 1 mile of the mobile device) being the user providing the mobile device with an input to zoom out to show promotions and/or marketing services within 5 miles of the mobile device.

As such, the mobile application testing system may be configured to analyze the data provided by the mobile device corresponding to the usage of the mobile application in accordance with the first application variant at 416. For example, the mobile application testing system may be configured to determine that a certain percentage of mobile application users using the application in accordance to the first application variant provided a first input to the mobile device after a map is displayed in accordance to the first application variant (i.e., the map displaying 10 promotions within 1 mile of the mobile device) causing the mobile device to display a zoomed out map showing promotions and/or marketing services within a radius greater than 1 mile of the mobile device. In some embodiments, the mobile application testing system may include predetermined usage metric thresholds for a plurality of tests, wherein each test is configured to determine the usage of the mobile application in a particular scenario. As such, a test, according to one embodiment, may be configured to determine whether a first zoom level configured to display promotions and/or marketing services within 1 mile of the mobile device is an appropriate first zoom level. As such, the mobile application testing system may be configured to determine when a usage metric threshold for the test has been reached. For example, a predetermined threshold may be set at approximately 75% of mobile devices interacting with the application in accordance with a first application variant provide data indicating that a first input is to change the zoom level of the map to at least 5 miles or greater. As such, when the mobile application testing system receives data corresponding to only 30% of mobile devices interacting with the application in accordance with a first application variant indicating that a first input is to change the zoom level of the map to at least 5 miles or greater, the mobile application testing system may determine that the predetermined threshold has not been met, and thus, will not modify subsequent variant selection indications as a result. Accordingly, a mobile device may be configured to receive a first variant selection indication when the mobile application is launched in a subsequent instance as the predetermined threshold has not been met.

At 420, a mobile device may be configured to receive a second application variant selection indication configured to cause the mobile device to interact with the mobile application according to the second application variant. For example, in an instance in which the mobile application testing system is configured to determine when a usage metric threshold for a test has been reached, the mobile application testing system may be further configured to transmit a second application variant selection indication to a plurality of mobile devices based at least in response to the predetermined threshold being met. Specifically, a predetermined threshold may be set at approximately 75% of mobile devices interacting with the application in accordance with a first application variant provide data indicating that a first input is to change the zoom level of the map to at least 5 miles or greater. As such, when the mobile application testing system receives data corresponding to 80% of mobile devices interacting with the application in accordance with a first application variant providing an indication that a first input after the map is displayed is to change the zoom level of the map to at least 5 miles or greater, the mobile application testing system may determine that the predetermined threshold has been met, and thus, will modify subsequent variant selection indications as a result. Accordingly, at 420, a mobile device may be configured to receive a second application variant selection indication configured to cause the mobile application to interact with the mobile device to thereby initially display a map displaying the location of the mobile device and at least 10 promotions and/or marketing services that are located within 5 miles of the mobile device. The method may end at 422.

FIG. 5 illustrates a flow chart for another example embodiment of a method of testing application variants of an application on a mobile device. In some embodiments, the method may be performed by a mobile application testing system and at least two mobile devices configured to communicate with the mobile application testing system. In some embodiments, the mobile devices may be able to communicate with the mobile application testing system such that the mobile devices and the system may be configured to transmit and/or receive data, indications, instructions, and/or the like from one another.

The method 500 may start when a first mobile device or a second mobile device launches a mobile application 502, 504 on the mobile device. Although FIG. 5 illustrates one embodiment illustrating that the mobile applications on the first and second mobile devices are launched at approximately a similar instance, one of ordinary skill in the art may appreciate that the testing of the mobile application does not require the mobile application to be launched at a similar instance. Rather, one of ordinary skill in the art may appreciate that the testing may occur over a period of time, wherein the mobile application testing system may be configured to receive data corresponding to the usage of the mobile application and may, accordingly, modify the mobile application based at least in response to receiving a plurality of data over a period of time regarding the usage of the mobile application.

According to one embodiment, the first and second mobile device may establish a connection with the mobile application testing system after launching the mobile application at 506, 508 respectively via a network, as shown in FIG. 1. For example, each of the mobile devices may comprise a communications module configured to communicate with the mobile application testing system, as described in further detail herein.

At 509, a first mobile device may be configured to transmit an application launch indication to the mobile application testing system via a network, as shown in FIG. 1. Specifically, the mobile device may include a communications module configured to communicate with the mobile application testing system and further be configured to transmit an indication that a mobile application has been executed by the mobile device to the mobile application testing system via the network subsequent to the first mobile device launching the mobile application at 502 and establishing a connection with the mobile application testing system at 506. At 511, a second mobile device may be configured to transmit an application launch indication to the mobile application testing system via the network subsequent to the second mobile device launching the mobile application at 504 and establishing a connection with the mobile application testing system at 508.

In some embodiments, the mobile application testing system, after having established a connection with each of the first and second mobile devices and receiving an application launch indication from each of the first and second mobile devices, may transmit a first application selection indication to a first mobile device at 510 and may transmit a second application selection indication to a second mobile device at 512. Although the transmission of the application selection indications to the first and second mobile devices by the mobile application testing system is shown in FIG. 5 to occur at differing times, one of ordinary skill in the art may appreciate that the transmission of the application selection indication may occur at any time after having established a connection to the respective mobile devices received an application launch indication from the respective mobile devices.

At 514, the first mobile device, having received a first application selection indication from the mobile application testing system, may be configured to interact with the mobile application according to the first application variant of the plurality of application variants. Further, at 516, the second mobile device, having received a second application selection indication from the mobile application testing system, may be configured to interact with the mobile application according to the second application variant of the plurality of application variants. As such, in some embodiments, the mobile application testing system may be configured to cause a first and second mobile device to interact with a mobile application in accordance with a first or second application variant based at least in part on transmitting a first or second application selection indication to the first and second mobile devices respectively.

For example, the mobile application testing system may be configured to transmit a first application selection indication to the first mobile device, which may cause the first mobile device to interact with the mobile application such that the mobile device displays a plurality of promotions and/or marketing services upon a display of the mobile device in a slide show format (i.e., a first promotion and/or marketing service may be displayed on the mobile device display for approximately 10 seconds before a second promotion and/or marketing service is automatically displayed on the mobile device without receiving an input from the user of the mobile device). Further, the mobile application testing system may be configured to transmit a second application selection indication to the second mobile device, which may cause the second mobile device to interact with the mobile application such that the second mobile device displays a single promotion and/or marketing service on the display of the second mobile device in a single instance and further requires the user to provide an input to the mobile device before displaying a subsequent promotion and/or marketing service).

Accordingly, the first and second mobile devices may be configured to transmit data corresponding to the usage of the mobile application in accordance with the first application variant and the second application variant respectively at 518, 520. Specifically, the first and second mobile devices may include a communications module configured to transmit the data associated with the usage of the first and second variants to the mobile application testing system. Accordingly, the mobile application testing system may be configured to receive data corresponding to the usage of the first and second variants by the first and second mobile devices respectively, and may be further configured to store, analyze, process and/ or otherwise interact with the data corresponding to the usage of the plurality of variants by the plurality of mobile devices. At 522,524, the first and second mobile devices may terminate the mobile application.

Although FIG. 5 illustrates the termination of the mobile application on the first and second mobile devices 522, 524 occurring prior to a mobile application testing system analyzing data corresponding to the usage of the mobile application according to a plurality of variants, one of ordinary skill in the art may appreciate that the mobile application testing system may analyze data corresponding to the variant usage at any time after the first and/or second mobile device transmits data corresponding to the mobile application usage in accordance with at least one of the variants.

At 526, the mobile application testing system may be configured to analyze data corresponding to the usage of the first and second variant by the first and second mobile devices respectively. For example, the mobile application testing system may be configured to analyze data corresponding to usage of the mobile application in accordance with the first application selection, which may cause the mobile device to display a plurality of promotions and/or marketing services upon a display of the mobile device in a slide show format and analyze data corresponding to the usage of the mobile application in accordance with the second application selection, which may cause the mobile device to display a single promotion and/or marketing service on the display of the second mobile device in a single instance and further requires the user to provide an input to the mobile device before displaying a subsequent promotion and/or marketing service. Specifically, the mobile application testing system may be configured to analyze data received from at least the first and second mobile device which corresponds to the usage of the first and second variant, such as data corresponding to the number of promotions and/or marketing services purchased when a mobile device interacts with the mobile application according to either the first or second application variant. In one embodiment, the mobile application testing system may be configured to determine that a predetermined threshold corresponding to the amount of promotions and/or marketing services purchased when a mobile application interacts with a mobile device according to a first or second variant has been met when the number of promotion purchases with a mobile application interacting with a mobile device according to one of the two variants exceeds the number of promotion purchases with a mobile application interacting with a mobile device according to the remaining variant by a particular amount, percentage, or other metric.

As such, the mobile application testing system may be configured to determine a revised application variant in response to analyzing data corresponding to the mobile application usage in accordance with at least one of the application variants at 527. For example, when data corresponding to the usage of the mobile application in accordance with a first application variant, which may cause the mobile device to display a plurality of promotions and/or marketing services upon a display of the mobile device in a slide show format, illustrates that 90% of promotions are bought when the mobile application is used in accordance with the first application variant, the mobile application testing system may be configured to determine a revised application variant. For example, when a predetermined threshold is set at when one of the at least two variants indicate a difference in promotion purchases of more than 50%, and when data corresponding to the usage of the mobile application in accordance with a second variant, which may cause the mobile device to display a single promotion and/or marketing service upon the display of the mobile device, provides that only 10% of promotions are purchased when the mobile application is used in accordance with the second variant, the mobile application testing system may be configured to determine that a revised application variant may include at least the first application variant and/or that a revised application variant selection indication may include at least the first variant selection indication.

Accordingly, the mobile application testing system may be further configured to transmit a revised application variant selection indication to at least one of the two mobile devices at 540, 542. For example, a first and second mobile device may launch the mobile application at an instance subsequent to terminating the mobile application on the first and second mobile devices respectively at 528, 530. In addition, the first and second mobile device may be configured to establish a connection with the mobile application testing system via a network at 532, 534. Once a connection has been established, the first and second mobile devices may be configured to transmit an application launch indication to the mobile application testing system at 536, 538.

Accordingly, in an instance where a mobile application testing system has determined a revised application variant in response to at least analyzing data corresponding to the usage of a first and second application variant, the mobile application testing system may be configured to transmit a revised application variant selection indication at 542 to the second mobile device thereby causing the second mobile device to interact with the mobile application in accordance with the revised application variant of the mobile application. Specifically, the revised application variant selection indication transmitted to the second mobile device may cause the second mobile device to interact with the mobile application in accordance with the first application variant, wherein the revised application variant includes, at least in part, the first application variant. In some embodiments, the mobile application testing system may be configured to transmit a revised application variant selection indication to the first mobile device at 540, wherein the first mobile device previously received an application variant selection indication substantially corresponding to the revised application variant. In another embodiment wherein a first mobile device originally received an application variant selection indication substantially corresponding to a revised application variant, the mobile application testing system may be configured to not transmit a revised application variant selection indication to the first mobile device. In some embodiments, the mobile application testing system may be configured to transmit an indication to the first mobile device that corresponds with instructions for the mobile application to interact with the mobile device according to the originally transmitted application variant selection when the mobile device originally received an application variant selection indication that substantially corresponds to the revised application variant. In another embodiment, the mobile application testing system may be configured to transmit an indication corresponding to the previously transmitted first or second application variant selection indications when the mobile application testing system has not determined a revised application variant in response to analyzing data corresponding to the usage of the mobile application in accordance with the first or second application variant.

Accordingly, after a mobile application testing system has transmitted a revised application variant selection to the first and/or second mobile device, in one embodiment, the first or second mobile device may be configured to run the mobile application according to the revised application variant at 546, 548. For example, the first and/or second mobile device may be configured to run the mobile application such that a plurality of promotions and/or marketing services is displayed upon a display of the mobile device in a slide show format.

As disclosed above, the mobile application testing system may leverage equipment and infrastructure used by merchants to implement a loyalty rewards program that allows consumers to redeem promotions at multiple participating merchants. In this fashion, the transaction processing system may provide an efficient and effective low-cost way for consumers to redeem promotions with participating merchants.

FIG. 6 illustrates a schematic block diagram of circuitry 600, some or all of which may be included in, for example, mobile application testing server 102, mobile application testing database 104 and/or mobile devices 110, 120, 130, 140. As illustrated in FIG. 6, in accordance with some example embodiments, circuitry 600 may include various means, such as a processor 602, memory 604, communication module 606, input/output module 608 and/or mobile application testing module 610.

In some embodiments, such as when circuitry 600 is included in a mobile application testing system 100 and/or mobile device 110, 120, 130, 140, mobile application testing module 610 may be included. As referred to herein, "module" includes hardware, software and/or firmware configured to perform one or more particular functions. In this regard, the means of circuitry 600 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 604) that is executable by a suitably configured processing device (e.g., processor 602), or some combination thereof.

Processor 602 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 6 as a single processor, in some embodiments, processor 602 comprises a plurality of processors. The plurality of processors may be embodied on a single computing device or may be distributed across a plurality of computing devices collectively configured to function as circuitry 600. The plurality of processors may be in operative communication with each other and may be collectively configured to perform one or more functionalities of circuitry 600 as described herein. In an example embodiment, processor 602 is configured to execute instructions stored in memory 604 or otherwise accessible to processor 602. These instructions, when executed by processor 602, may cause circuitry 600 to perform one or more of the functionalities of circuitry 600 as described herein.

Whether configured by hardware, firmware/software methods, or by a combination thereof, processor 602 may comprise an entity capable of performing operations according to embodiments of the present invention while configured accordingly. Thus, for example, when processor 602 is embodied as an ASIC, FPGA or the like, processor 602 may comprise specifically configured hardware for conducting one or more operations described herein. As another example, when processor 602 is embodied as an executor of instructions, such as may be stored in memory 604, the instructions may specifically configure processor 602 to perform one or more algorithms and operations described herein.

Memory 604 may comprise, for example, volatile memory, non-volatile memory, or some combination thereof. Although illustrated in FIG. 6 as a single memory, memory 604 may comprise a plurality of memory components. The plurality of memory components may be embodied on a single computing device or distributed across a plurality of computing devices. In various embodiments, memory 604 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 604 may be configured to store information, data, applications, instructions, or the like for enabling circuitry 600 to carry out various functions in accordance with example embodiments discussed herein. For example, in at least some embodiments, memory 604 is configured to buffer input data for processing by processor 602. Additionally or alternatively, in at least some embodiments, memory 604 may be configured to store program instructions for execution by processor 602. Memory 604 may store information in the form of static and/or dynamic information. This stored information may be stored and/or used by circuitry 600 during the course of performing its functionalities.

Communications module 606 may be embodied as any device or means embodied in circuitry, hardware, a computer program product comprising computer readable program instructions stored on a computer readable medium (e.g., memory 604) and executed by a processing device (e.g., processor 602), or a combination thereof that is configured to receive and/or transmit data from/to another device, such as, for example, a second circuitry 600 and/or the like. In some embodiments, communications module 606 (like other components discussed herein) can be at least partially embodied as or otherwise controlled by processor 602. In this regard, communications module 606 may be in communication with processor 2602, such as via a bus. Communications module 606 may include, for example, an antenna, a transmitter, a receiver, a transceiver, network interface card and/or supporting hardware and/or firmware/software for enabling communications with another computing device. Communications module 606 may be configured to receive and/or transmit any data that may be stored by memory 604 using any protocol that may be used for communications between computing devices. Communications module 606 may additionally or alternatively be in communication with the memory 604, input/output module 608 and/or any other component of circuitry 600, such as via a bus.

Input/output module 608 may be in communication with processor 602 to receive an indication of a user input and/or to provide an audible, visual, mechanical, or other output to a user. Some example visual outputs that may be provided to a user by circuitry 600 are discussed in connection with the displays described above. As such, input/output module 608 may include support, for example, for a keyboard, a mouse, a joystick, a display, an image capturing device, a touch screen display, a microphone, a speaker, a RFID reader, barcode reader, biometric scanner, and/or other input/output mechanisms. In embodiments wherein circuitry 600 is embodied as a server or database, aspects of input/output module 608 may be reduced as compared to embodiments where circuitry 600 is implemented as an end-user machine (e.g., consumer device and/or merchant device) or other type of device designed for complex user interactions. In some embodiments (like other components discussed herein), input/output module 608 may even be eliminated from circuitry 600. Input/output module 608 may be in communication with memory 604, communications module 606, and/or any other component(s), such as via a bus. Although more than one input/output module and/or other component can be included in circuitry 600, only one is shown in FIG. 8 to avoid over-complicating the drawing (like the other components discussed herein).

Mobile Application Testing Module 610 may also or instead be included and configured to perform the functionality discussed herein related to facilitating the testing of multiple application variants of a mobile application discussed above. In some embodiments, some or all of the functionality facilitating testing of multiple application variants of a mobile application may be performed by processor 602. In this regard, the example processes and algorithms discussed herein can be performed by at least one processor 602 and/or mobile application testing module 610. For example, non-transitory computer readable storage media can be configured to store firmware, one or more application programs, and/or other software, which include instructions and other computer-readable program code portions that can be executed to control processors of the components of system 600 to implement various operations, including the examples shown above. As such, a series of computer-readable program code portions may be embodied in one or more computer program products and can be used, with a computing device, server, and/or other programmable apparatus, to produce the machine-implemented processes discussed herein.

Any such computer program instructions and/or other type of code may be loaded onto a computer, processor or other programmable apparatuses circuitry to produce a machine, such that the computer, processor other programmable circuitry that executes the code may be the means for implementing various functions, including those described herein.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

That which is claimed:

1. A method for testing application variants of an application on a mobile device, the method comprising:
   causing a first application variant selection indication to be transmitted to at least one mobile device of a plurality of mobile devices having the application, wherein the first application variant selection indication is configured to cause the at least one mobile device to interact with the application according to a first application variant of the application of the plurality of application variants;

causing a second application variant selection indication to be transmitted to the at least one mobile device, wherein the second application variant selection indication is configured to cause the at least one mobile device to interact with the application according to a second application variant of the application of the plurality of application variants, wherein the application is configured to display one or more promotions provided by a promotion and marketing service, wherein the first application variant is configured to display the one or more promotions according to a first display format, and wherein the second application variant is configured to display the one or more promotions according to a second display format;

analyzing data corresponding to a usage of the first application variant and a usage of the second application variant to determine whether at least one of the first application variant or the second application variant satisfies a predetermined usage threshold;

causing the mobile device to at least one of remove or modify the first application variant from the plurality of application variants in an instance in which the first application fails to satisfy the predetermined usage threshold;

causing the mobile device to at least one of remove or modify the second application variant from the plurality of application variants in an instance in which the second application fails to satisfy the predetermined usage threshold;

causing transmittal of only the first application variant selection indication after analyzing data corresponding to the usage of the first application variant and the second application variant in an instance in which usage of the first application variant and the second application variant identifies that promotions are purchased at a higher percentage when the first application variant selection indication is transmitted to a mobile device compared to when the second application variant selection indication is transmitted to a mobile device; and causing transmittal of only the second application variant selection indication after analyzing data corresponding to the usage of the first application variant and the second application variant in an instance in which usage of the first application variant and the second application variant identifies that promotions are purchased at a higher percentage when the second application variant selection indication is transmitted to a mobile device compared to when the first application variant selection indication is transmitted to a mobile device.

2. A method according to claim 1 further comprising:
receiving an application launch indication from the at least one mobile device signaling that the application has been launched on the at least one mobile device; and
causing at least one of the first variant selection indication or the second variant selection indication to be transmitted to the at least one mobile device based at least in response to receiving the application launching indication.

3. A method according to claim 2, wherein the first application variant is a different application variant when compared to the second application variant.

4. A method according to claim 3, wherein the first application variant selection indication is transmitted to a first mobile device, and wherein the second application variant selection indication is transmitted to a second mobile device.

5. A method according to claim 4, further comprising removing an application variant from the plurality of application variants based at least on a determination that a variant usage metric has met a predetermined threshold.

6. A method according to claim 4, further comprising:
receiving an application launching indication from a third mobile device signaling that the application has been launched; and
causing a revised variant selection indication to be transmitted to the third mobile device, the revised variant selection indication configured to cause the third mobile device to use one of the first or second application variants.

7. A method according to claim 1 further comprising:
causing an application comprising a plurality of application variants to be provided to a plurality of mobile devices; and
receiving data corresponding to the usage of at least the first application variant or the second application variant from the at least one mobile device.

8. A method according to claim 7 further comprising modifying the application based at least in response to analyzing data corresponding to the usage of the first application variant by the at least one mobile device.

9. A method according to claim 8 further comprising causing a modified application comprising a plurality of variants to be transmitted to a plurality of mobile devices, wherein the modified application does not include the other of the first or second application variants.

10. An apparatus comprising:
at least one processor, and
at least one memory including computer program code, the at least one memory and the computer program code configured to, with the at least one processor, cause the apparatus to at least:
cause a first application variant selection indication to be transmitted to at least one mobile device of a plurality of mobile devices having the application, the first application variant selection corresponding to the first application variant of the application;
cause a second application variant selection indication to be transmitted to the at least one mobile device, the second application variant selection corresponding to the second application variant of the application;
analyze data corresponding to a usage of the first application variant and the second application variant to determine whether at least one of the first application variant or the second application variant satisfies a predetermined usage threshold;
cause the apparatus to at least one of remove or modify the first application variant from the plurality of application variants in an instance in which the first application fails to satisfy the predetermined usage threshold; and
cause the apparatus to at least one of remove or modify the second application variant from the plurality of application variants in an instance in which the second application fails to satisfy the predetermined usage threshold;
cause transmittal of only the first application variant selection indication after analyzing data corresponding to the usage of the first application variant and the second application variant in an instance in which usage of the first application variant and the second application variant identifies that promotions are purchased at a higher percentage when the first application variant selection indication is transmitted to a mobile device compared to when the second application variant selection indication is transmitted to a mobile device; and cause transmittal of only the second application variant selection indication after analyzing data corresponding to the usage of the first application variant and the second application variant in an instance in which usage of the first application variant and the second application variant identifies that promotions are purchased at a higher percentage when the second application variant selection indication is transmitted to a mobile device compared to when the first application variant selection indication is transmitted to a mobile device.

11. An apparatus according to claim 10, wherein the first application variant selection indication is configured to cause the at least one mobile device to interact with the application according to a first application variant of the plurality of application variants, and wherein the second application variant selection indication is configured to cause the at least one mobile device to interact with the application according to a second application variant of the plurality of application variants.

12. An apparatus according to claim 11, wherein the first application variant is a different application variant when compared to the second application variant.

13. An apparatus according to claim 12, wherein the at least one memory including computer program code is further configured to, with the at least one processor, cause the apparatus to remove an application variant from the plurality of application variants based at least on a determination that usage falls below a certain threshold.

14. An apparatus according to claim 12, wherein the at least one memory including computer program code is further configured to, with the at least one processor, cause the apparatus to:

receive an application launching indication from a third mobile device signaling that the application has been launched; and cause a revised variant selection indication to be transmitted to the third mobile device, the revised variant selection indication configured to cause the third mobile device to use one of the first or second application variants.

15. An apparatus according to claim 10, wherein the at least one memory including computer program code is further configured to, with the at least one processor, cause the apparatus to:

receive an application launch indication from the at least one mobile device signaling that the application has been launched on the at least one mobile device; and cause at least one of the first variant selection indication or the second variant selection indication to be transmitted to the at least one mobile device based at least in response to receiving the application launching indication.

16. An apparatus according to claim 15, wherein the first application variant selection indication is transmitted to a first mobile device, and wherein the second application variant selection indication is transmitted to a second mobile device.

17. An apparatus according to claim 10, wherein the at least one memory including computer program code is further configured to, with the at least one processor, cause the apparatus to:

cause an application comprising a plurality of application variants to be provided to a plurality of mobile devices; and receive data corresponding to the usage of at least the first application variant or the second application variant from the at least one mobile device.

18. An apparatus according to claim 10, wherein the at least one memory including computer program code is further configured to, with the at least one processor, cause the apparatus to modify the application based at least in response to analyzing data corresponding to the usage of the first application variant by the at least one mobile device.

19. An apparatus according to claim 18, wherein the at least one memory including computer program code is further configured to, with the at least one processor, cause the apparatus to cause a modified application comprising a plurality of variants to be transmitted to a plurality of mobile devices, wherein the modified application does not include the other of the first or second application variants.

20. A computer program product comprising:

at least one computer readable non-transitory memory medium having program code instructions stored thereon, the program code instructions which when executed by an apparatus cause the apparatus at least to:

cause a first application variant selection indication to be transmitted to at least one mobile device of a plurality of mobile devices having the application, wherein the first application variant selection indication is configured to cause the at least one mobile device to interact with the application according to a first application variant of the application of the plurality of application variants;

cause a second application variant selection indication to be transmitted to the at least one mobile device, wherein the second application variant selection indication is configured to cause the at least one mobile device to interact with the application according to the second application variant of the application of the plurality of application variants;

analyze data corresponding to a usage of the first application variant and the second application variant to determine whether at least one of the first application variant or the second application variant satisfies a predetermined usage threshold;

cause the apparatus to at least one of remove or modify the first application variant from the plurality of application variants in an instance in which the first application fails to satisfy the predetermined usage threshold; and cause the apparatus to at least one of remove or modify the second application variant from the plurality of application variants in an instance in which the second application fails to satisfy the predetermined usage threshold;

cause transmittal of only the first application variant selection indication after analyzing data corresponding to the usage of the first application variant and the second application variant in an instance in which usage of the first application variant and the second application variant identifies that promotions are purchased at a higher percentage when the first application variant selection indication is transmitted to a mobile device compared to when the second application variant selection indication is transmitted to a mobile device; and cause transmittal of only the second application variant selection indication after analyzing data corresponding to the usage of the first application variant and the second application variant in an instance in which usage of the first application variant and the second application variant identifies that promotions are purchased at a higher percentage when the second application variant selection indication is transmitted to a mobile device compared to when the first application variant selection indication is transmitted to a mobile device.

21. The computer program product according to claim 20, wherein the program code instructions are further configured to, when executed by the apparatus, cause the apparatus at least to:
receive an application launch indication from the at least one mobile device signaling that the application has been launched on the at least one mobile device; and
cause at least one of the first variant selection indication or the second variant selection indication to be transmitted to the at least one mobile device based at least in response to receiving the application launching indication.

22. A computer program product according to claim 21, wherein the first application variant selection indication is transmitted to a first mobile device, and wherein the second application variant selection indication is transmitted to a second mobile device.

23. A computer program product according to claim 20, wherein the first application variant is a different application variant when compared to the second application variant.

24. A computer program product according to claim 23, wherein the program code instructions are further configured to, when executed by the apparatus, cause the apparatus at least to remove an application variant from the plurality of application variants based at least on a determination that usage falls below a certain threshold.

25. A computer program product according to claim 23, wherein the program code instructions are further configured to, when executed by the apparatus, cause the apparatus:
receive an application launching indication from a third mobile device signaling that the application has been launched; and
cause a revised variant selection indication to be transmitted to the third mobile device, the revised variant selection indication configured to cause the third mobile device to use one or more first or second application variants.

26. A computer program product according to claim 25, wherein the program code instructions are further configured to, when executed by the apparatus, cause the apparatus to modify the application based at least in response analyzing data corresponding to the usage of at least one of the variants of the application by the at least one mobile device.

27. A computer program product according to claim 20, wherein the program code instructions are further configured to, when executed by the apparatus, cause the apparatus:
cause an application comprising a plurality of application variants to be provided to a plurality of mobile devices; and
receive data corresponding to the usage of at least the first application variant or the second application variant from the at least one mobile device.

28. A computer program product according to claim 27, wherein the program code instructions are further configured to, when executed by the apparatus, cause the apparatus at least to transmit a modified application comprising a plurality of variants to a plurality of mobile devices, wherein the modified application does not include the other of the first or second application variant.

29. A mobile application testing system comprising:
a mobile application testing server comprising:
processing circuitry configured to:
cause a first application variant selection indication to be transmitted to at least one mobile device of a plurality of mobile devices having the application, wherein the first application variant selection indication is configured to cause the at least one mobile device to interact with the application according to a first application variant of the application of the plurality of application variants;
cause a second application variant selection indication to be transmitted to the at least one mobile device, wherein the second application variant selection indication is configured to cause the at least one mobile device to interact with the application according to the second application variant of the application of the plurality of application variants;
analyze data corresponding to the usage of the first application variant and the second application variant to determine whether at least one of the first application variant or the second application variant satisfies a predetermined usage threshold;
cause the mobile device to at least one of remove or modify the first application variant from the plurality of application variants in an instance in which the first application fails to satisfy the predetermined usage threshold;
cause the mobile device to at least one of remove or modify the second application variant from the plurality of application variants in an instance in which the second application fails to satisfy the predetermined usage threshold; and
cause transmittal of only the first application variant selection indication after analyzing data corresponding to the usage of the first application variant and the second application variant in an instance in which usage of the first application variant and the second application variant identifies that promotions are purchased at a higher percentage when the first application variant selection indication is transmitted to a mobile device compared to when the second application variant selection indication is transmitted to a mobile device;
cause transmittal of only the second application variant selection indication after analyzing data corresponding to the usage of the first application variant and the second application variant in an instance in which usage of the first application variant and the second application variant identifies that promotions are purchased at a higher percentage when the second application variant selection indication is transmitted to a mobile device compared to when the first application variant selection indication is transmitted to a mobile device
communications circuitry configured to facilitate communications with at least one mobile device, and further configured to:
receive an application launch indication from the at least one mobile device signaling that the application has been launched on the at least one mobile device; and
at least one mobile device comprising:

a display configured to display a mobile application;

communications circuitry configured to facilitate communications with at least one mobile application testing server, and processing circuitry configured to wirelessly receive the plurality of variant selection indications from the mobile application testing server and to send the application launching indication to the mobile application testing server.

30. A method for testing application variants of an application on a mobile device, the method comprising:

transmitting an application launch indication signaling that the application has been launched on the at least one mobile device;

receiving a first application variant selection indication, wherein the mobile device includes an application, wherein the first application variant selection indication is configured to cause the at least one mobile device to interact with the application according to a first application variant of the application of the plurality of application variants;

transmitting data corresponding to the usage of at least the first application variant by the mobile device;

receiving a second application variant selection indication, wherein the second application variant selection indication is configured to cause the at least one mobile device to interact with the application according to a second application variant of the application of the plurality of application variants;

transmitting data corresponding to the usage of at least the first application variant by the mobile device, wherein data corresponding to the usage of the first application variant and the usage of the second application variant is analyzed to determine whether at least one of the first application variant or the second application variant satisfies a predetermined usage threshold and to determine whether to at least one of remove or modify the first application variant or the second application variant;

causing transmittal of only the first application variant selection indication after analyzing data corresponding to the usage of the first application variant and the second application variant in an instance in which usage of the first application variant and the second application variant identifies that promotions are purchased at a higher percentage when the first application variant selection indication is transmitted to a mobile device compared to when the second application variant selection indication is transmitted to a mobile device; and causing transmittal of only the second application variant selection indication after analyzing data corresponding to the usage of the first application variant and the second application variant in an instance in which usage of the first application variant and the second application variant identifies that promotions are purchased at a higher percentage when the second application variant selection indication is transmitted to a mobile device compared to when the first application variant selection indication is transmitted to a mobile device.

31. A method according to claim 30, wherein receiving a first application variant selection indication is caused by at least transmitting an application launch indication to a mobile application testing server.

32. A method according to claim 31, wherein the first application variant is a different application variant when compared to the second application variant.

33. A method according to claim 32, wherein receiving a second application variant selection indication is caused in part by transmitting data corresponding to the usage of the at least first application variant by the mobile device.

34. A method according to claim 30 further comprising receiving a variant indication configured to cause the at least one mobile device to not interact with the application according to a third application variant of the plurality of application variants.

35. A method according to claim 34, wherein the third application variant is one of the first or second application variants.

36. A method according to claim 35 further comprising receiving a modified application comprising a plurality of variants, wherein the modified application does not include the third application variant previously provided in the application.

* * * * *